(12) United States Patent
Mantell

(10) Patent No.: US 11,230,063 B2
(45) Date of Patent: *Jan. 25, 2022

(54) SYSTEM AND METHOD FOR ADJUSTING THE SPEED OF A MULTI-NOZZLE EXTRUDER DURING ADDITIVE MANUFACTURING WITH REFERENCE TO AN ANGULAR ORIENTATION OF THE EXTRUDER

(71) Applicant: Xerox Corporation, Norwalk, CT (US)

(72) Inventor: David A. Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/878,785

(22) Filed: May 20, 2020

(65) Prior Publication Data
US 2020/0282658 A1    Sep. 10, 2020

Related U.S. Application Data

(63) Continuation of application No. 15/817,588, filed on Nov. 20, 2017, now Pat. No. 10,682,816.

(51) Int. Cl.
| | | |
|---|---|---|
| *B29C 64/393* | (2017.01) | |
| *B33Y 10/00* | (2015.01) | |
| *B33Y 30/00* | (2015.01) | |
| *B33Y 50/02* | (2015.01) | |
| *B29C 64/118* | (2017.01) | |

(Continued)

(52) U.S. Cl.
CPC ............ *B29C 64/393* (2017.08); *B29C 48/92* (2019.02); *B29C 64/118* (2017.08); *B29C 64/209* (2017.08); *B29C 64/227* (2017.08); *B33Y 10/00* (2014.12); *B33Y 30/00* (2014.12); *B33Y 50/02* (2014.12); *B29C 48/05* (2019.02); *B29C 48/266* (2019.02); *B29C 48/345* (2019.02);

(Continued)

(58) Field of Classification Search
CPC ................. B29C 64/118; B29C 64/209; B29C 64/386–393

See application file for complete search history.

(56) References Cited

U.S. PATENT DOCUMENTS

| | | |
|---|---|---|
| 5,121,329 A | 6/1992 | Crump |
| 6,238,613 B1 | 5/2001 | Batchelder et al. |

(Continued)

*Primary Examiner* — Matthew J Daniels
*Assistant Examiner* — Andrew L Swanson
(74) *Attorney, Agent, or Firm* — Maginot Moore & Beck LLP

(57) ABSTRACT

An additive manufacturing system operates an extruder to extrude a swath of thermoplastic material through at least two nozzles of the extruder to form a swath of thermoplastic material along a path of relative movement between the extruder and a platform. The speed of the extruder along the path corresponds to a predetermined speed selected with reference to an orientation of the extruder and the angle for the path of relative movement between the extruder and the platform. A controller in the system operates at least one actuator operatively connected to at least one of the extruder and the platform to move the at least one of the extruder and the platform relative to the other of the extruder and the platform along the path of relative movement at the predetermined speed to make the swath of the thermoplastic material contiguous in a cross-process direction.

6 Claims, 7 Drawing Sheets

(51) Int. Cl.
  *B29C 64/209* (2017.01)
  *B29C 48/92* (2019.01)
  *B29C 64/227* (2017.01)
  B29C 48/05 (2019.01)
  B29C 64/112 (2017.01)
  B29C 48/345 (2019.01)
  B29C 48/25 (2019.01)
  B29K 55/02 (2006.01)
  B29K 67/00 (2006.01)
  B29K 77/00 (2006.01)

(52) U.S. Cl.
  CPC ......... *B29C 64/112* (2017.08); *B29K 2055/02* (2013.01); *B29K 2067/046* (2013.01); *B29K 2077/10* (2013.01)

(56) References Cited

U.S. PATENT DOCUMENTS

| | | | |
|---|---|---|---|
| 6,402,403 B1 | 6/2002 | Speakman | |
| 10,682,816 B2* | 6/2020 | Mantell | ................ B29C 64/393 |
| 2009/0134540 A1 | 5/2009 | Khoshnevis | |
| 2014/0061974 A1 | 3/2014 | Tyler | |
| 2015/0367571 A1* | 12/2015 | Kanada | ................ B29C 64/106 |
| | | | 264/211.12 |
| 2016/0009030 A1 | 1/2016 | Mark et al. | |
| 2016/0325498 A1 | 11/2016 | Gelbart | |
| 2017/0066187 A1 | 3/2017 | Mark et al. | |
| 2017/0157831 A1* | 6/2017 | Mandel | ................ B33Y 30/00 |

\* cited by examiner

SYSTEM AND METHOD FOR ADJUSTING THE SPEED OF A MULTI-NOZZLE EXTRUDER DURING ADDITIVE MANUFACTURING WITH REFERENCE TO AN ANGULAR ORIENTATION OF THE EXTRUDER

PRIORITY CLAIM

This application is a continuation of and claims priority to pending U.S. patent application Ser. No. 15/817,588, which is entitled "System And Method For Adjusting The Speed Of A Multi-Nozzle Extruder During Additive Manufacturing With Reference To An Angular Orientation Of The Extruder," which was filed on Nov. 20, 2017, and which issued as U.S. U.S. Pat. No. 10,682,816 on Jun. 16, 2020, the entirety of which is hereby expressly incorporated by reference.

TECHNICAL FIELD

This disclosure is directed to multi-nozzle extruders used in three-dimensional object printers and, more particularly, to the formation of different features with such extruders.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use extruders that soften or melt extrusion material, such as ABS plastic, into thermoplastic material and then emit the thermoplastic material in a predetermined pattern. The printer typically operates the extruder to form successive layers of the thermoplastic material that form a three-dimensional printed object with a variety of shapes and structures. After each layer of the three-dimensional printed object is formed, the thermoplastic material cools and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Many existing three-dimensional printers use a single extruder that extrudes material through a single nozzle. The printhead moves in a predetermined path to emit the build material onto selected locations of a support member or previously deposited layers of the three-dimensional printed object based on model data for the three-dimensional printed object. However, using a printhead with only a single nozzle to emit the build material often requires considerable time to form a three-dimensional printed object. Additionally, a printhead with a larger nozzle diameter can form three-dimensional printed object more quickly but loses the ability to emit build material in finer shapes for higher detailed objects while nozzles with narrower diameters can form finer detailed structures but require more time to build the three-dimensional object.

To address the limitations of single nozzle extruders, multi-nozzle extruders have been developed. In these multi-nozzle extruders, the nozzles are formed in a common faceplate and the materials extruded through the nozzles can come from one or more manifolds. In extruders having a single manifold, all of the nozzles extrude the same material, but the fluid path from the manifold to each nozzle can include a valve that is operated to open and close the nozzles selectively. This ability enables the shape of the swath of thermoplastic material extruder from the nozzles to be varied by changing the number of nozzles extruding material and which ones are extruding material. In extruders having different manifolds, each nozzle can extrude a different material with the fluid path from one of the manifolds to its corresponding nozzle including a valve that can be operated to open and close the nozzle selectively. This ability enables the composition of the material in a swath to vary as well as the shape of the swath of thermoplastic material extruder from the nozzles to be varied. Again, these variations are achieved by changing the number of nozzles extruding material and which ones are extruding material. These multi-nozzle extruders enable different materials to be extruded from different nozzles and used to form an object without having to coordinate the movement of different extruder bodies. These different materials can enhance the ability of the additive manufacturing system to produce objects with different colors, physical properties, and configurations. Additionally, by changing the number of nozzles extruding material, the size of the swaths produced can be altered to provide narrow swaths in areas where precise feature formation is required, such as object edges, and to provide broader swaths to quickly form areas of an object, such as its interior regions.

In these multi-nozzle extruders having their nozzles in a common faceplate, the movement of the faceplate with reference to the build platform as well as the orientation of the faceplate with respect to the XY axes of the platform are critical to the formation of a swath. As used in this document, a "swath" refers to the extrusion of material from any opened nozzle in a multi-nozzle extruder as an aggregate as long as at least one nozzle remains open and material is extruded from any opened nozzle. That is, even if multiple nozzles are opened, but not all of the emitted extrusions contact one another, the discrete extrusions constitute a swath. A contiguous swath is one in which all of the extrusions from multiple nozzles are in contiguous contact across the swath in a cross-process direction. At some orientations of the extruder, some of the nozzles align with one another in a way that may prevent a contiguous swath of extruded material from being formed. As shown in FIG. 7, a previously known faceplate having nine nozzles is depicted. When the faceplate is oriented as shown in the figure and moved along the 0°-180° (X) axis or the 90°-270° (Y) axis, all nine nozzles contribute to forming a contiguous swath and the swath has its greatest width. As used in this document, the term "0° 480° axis" means movement in either the 0° direction or the 180° direction with the faceplate of the extruder oriented so if all of the nozzles are open, then the widest contiguous swath that the extruder can produce is formed and the term "90°-270° axis" means movement in either the 90° or the 270° direction with the faceplate of the extruder oriented so if all of the nozzles are open, then the widest contiguous swath that the extruder can produce is formed. When the faceplate remains oriented as shown on the 0°-180° axis and 90°-270° axis, but moved in one of the directions rotated 18° from one of these axis, as shown in the far right illustration, the nine nozzles become three rows of three nozzles that are aligned with one another and the swath is only three nozzles wide with gaps between the extruded lines forming the swath. Thus, the widest swaths are produced when the faceplate of FIG. 7 is moved along the 0°, 90°, 180°, and 270° paths and the swaths are most narrow and the beads of extruded material are most separated from one another along the 18°, 108°, 198°, and 288° paths. The separation occurs because the orientation of the faceplate and the direction of the relative movement between the extruder and the platform arranges the nozzles in the faceplate into an array having orthogonal columns and rows. This arrangement reduces the distance between the lines formed by the nozzles in the columns so the lines align with one another and separates the lines by the spacing between the nozzles in a row. In the center of an object where feature differentiation is usually unimportant, the faceplate movement is preferred to be in one of the directions producing the widest contiguous swaths so object formation speed can be maximized. At the outside edges of an object where feature shapes are more varied and sometimes intricate; however, fewer nozzles, and perhaps only a single nozzle, may be opened to enable formation of the features. Unfortunately, this type of extruder operation does not capitalize on the large number of nozzles available for object formation and is inherently slow. Thus, much of the speed advantage in having multiple nozzles in a common faceplate is lost and, for many parts, more time can be spent on the outline of the object than was spent on the formation of the interior of the object. A three-dimensional object printer having multiple nozzles in a common faceplate that can exploit the number of available nozzles at the formation of object exteriors would be beneficial.

SUMMARY

A new extruder adjusts the speed of the extruder movement with reference to the angle at which the faceplate is moved to enable multiple nozzles to fill in the gaps between extruded lines to form exterior features. The apparatus includes a platform configured to support an object during manufacturing, an extruder having a plurality of nozzles, at least one actuator operatively connected to at least one of the extruder and the platform, the at least one actuator being configured to move the at least one of the extruder and the platform relative to the other of the extruder and the platform, and a controller operatively connected to the extruder and the at least one actuator. The controller is configured to (1) operate the extruder to extrude a swath of thermoplastic material through at least two of the nozzles of the extruder with reference to object image data and extruder path data to form a swath of thermoplastic material along a path of relative movement between the extruder and the platform, and (2) operate the at least one actuator to move the at least one of the extruder and the platform along the path of relative movement at a predetermined speed, the controller selecting the predetermined speed with reference to an orientation of a faceplate of the extruder and an angle for the path of relative movement between the extruder and the platform to make the swath of the thermoplastic material contiguous in a cross-process direction.

A new method operates an extruder to adjust the speed of the extruder movement with reference to the angle at which the faceplate is moved to enable multiple nozzles to fill in the gaps between extruded lines to form exterior features. The method includes operating with a controller an extruder to extrude a swath of thermoplastic material through at least two nozzles of the extruder with reference to object image data and extruder path data to form a swath of thermoplastic material along a path of relative movement between the extruder and a platform that supports the object being formed with the thermoplastic material, selecting with the controller a predetermined speed for the relative movement between the extruder and the platform with reference to an orientation of a faceplate of the extruder and an angle for the path of relative movement between the extruder and the platform, and operating with the controller at least one actuator operatively connected to at least one of the extruder and the platform to move the at least one of the extruder and the platform relative to the other of the extruder and the platform along the path of relative movement at the predetermined speed to make the swath of the thermoplastic material contiguous in a cross-process direction.

BRIEF DESCRIPTION OF THE DRAWINGS

The foregoing aspects and other features of systems that form objects with thermoplastic material extruded from extruders are explained in the following description, taken in connection with the accompanying drawings.

DETAILED DESCRIPTION

Figure 1:
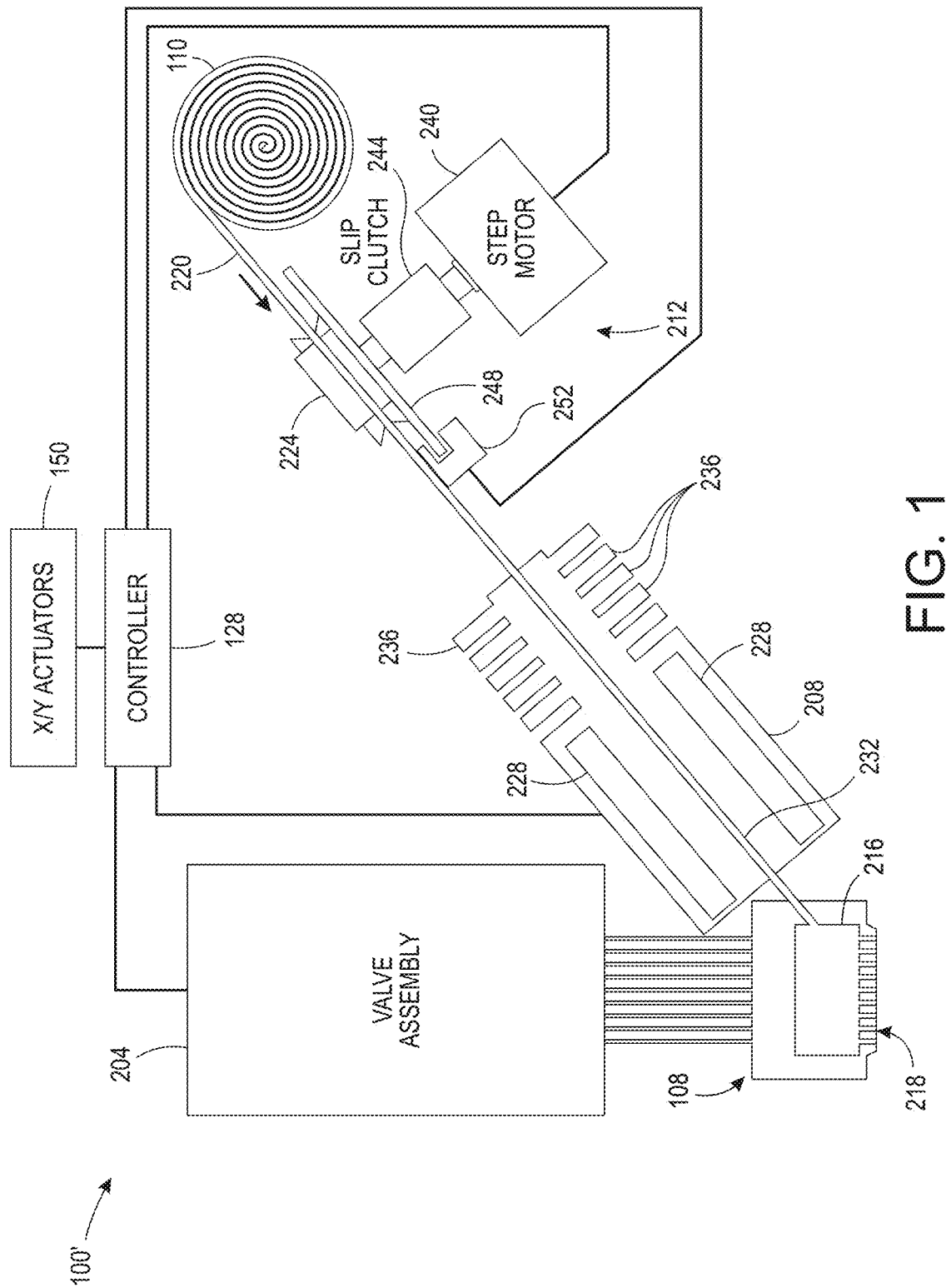
FIG. 1 depicts an additive manufacturing system that regulates a speed at which an extruder is moved to form a swath with reference to an angle of motion for the extruder.

For a general understanding of the environment for the device disclosed herein as well as the details for the device, reference is made to the drawings. In the drawings, like reference numerals designate like elements.

As used herein, the term "extrusion material" refers to a material that is softened or melted to form thermoplastic material to be emitted by an extruder in an additive manufacturing system. The extrusion materials include, but are not strictly limited to, both "build materials" that form permanent portions of the three-dimensional printed object and "support materials" that form temporary structures to support portions of the build material during a printing process and are then optionally removed after completion of the printing process. Examples of build materials include, but are not limited to, acrylonitrile butadiene styrene (ABS) plastic, polylactic acid (PLA), aliphatic or semi-aromatic polyamides (Nylon), plastics that include suspended carbon fiber or other aggregate materials, electrically conductive polymers, and any other form of material that can be thermally treated to produce thermoplastic material suitable for emission through an extruder. Examples of support materials include, but are not limited to, high-impact polystyrene (HIPS), polyvinyl alcohol (PVA), and other materials capable of extrusion after being thermally treated. In some extrusion printers, the extrusion material is supplied as continuous elongated length of material commonly known as a "filament." This filament is provided in a solid form by one or more rollers pulling the extrusion material filament from a spool or other supply and feeding the filament into a heater that is fluidly connected to a manifold within the extruder. Although the illustrated examples use extrusion material that is supplied as filament to the heaters, other extrusion material supplies can be used, such as particulate or spherical ball extrusion materials. The heater softens or melts the extrusion material filament to form a thermoplastic material that flows into the manifold. When a valve positioned between a nozzle and the manifold is opened, a portion of the thermoplastic material flows from the manifold through the nozzle and is emitted as a stream of thermoplastic material. As used herein, the term "melt" as applied to extrusion material refers to any elevation of temperature for the extrusion material that softens or changes the phase of the extrusion material to enable extrusion of the thermoplastic material through one or more nozzles in an extruder during operation of a three-dimensional object printer. The melted extrusion material is also denoted as "thermoplastic material" in this document. As those of skill in the art recognize, certain amorphous extrusion materials do not transition to a pure liquid state during operation of the printer.

As used herein, the terms "extruder" refers to a component of a printer that melts extrusion material in a single fluid chamber and provides the melted extrusion material to a manifold connected to one or more nozzles. Some extruders include a valve assembly that can be electronically operated to enable thermoplastic material to flow through nozzles selectively. The valve assembly enables the one or more nozzles to be connected to the manifold independently to extrude the thermoplastic material. As used herein, the term "nozzle" refers to an orifice in an extruder that is fluidly connected to the manifold in an extruder and through which thermoplastic material is emitted towards a material receiving surface. During operation, the nozzle can extrude a substantially continuous linear swath of the thermoplastic material along the process path of the extruder. A controller operates the valves in the valve assembly to control which nozzles connected to the valve assembly extrude thermoplastic material. The diameter of the nozzle affects the width of the line of extruded thermoplastic material. Different extruder embodiments include nozzles having a range of orifice sizes with wider orifices producing lines having widths that are greater than the widths of lines produced by narrower orifices.

As used herein, the term "manifold" refers to a cavity formed within a housing of an extruder that holds a supply of thermoplastic material for delivery to one or more nozzles in the extruder during a three-dimensional object printing operation. As used herein, the term "swath" refers to any pattern of the extrusion material that the extruder forms on a material receiving surface during a three-dimensional object printing operation. Common swaths include straight-line linear arrangements of extrusion material and curved swaths. In some configurations, the extruder extrudes the thermoplastic material in a continuous manner to form the swath with a contiguous mass of the extrusion material in both process and cross-process directions, while in other configurations the extruder operates in an intermittent manner to form smaller groups of thermoplastic material that are arranged along a linear or curved path. The three-dimensional object printer forms various structures using combinations of different swaths of the extrusion material. Additionally, a controller in the three-dimensional object printer uses object image data and extruder path data that correspond to different swaths of extrusion material prior to operating the extruder to form each swath of extrusion material. As described below, the controller optionally adjusts the operation of the valve assembly and the speed at which the extruder is moved to form multiple swaths of thermoplastic material through one or more nozzles during a three-dimensional printing operation.

As used herein, the term "process direction" refers to a direction of relative movement between an extruder and a material receiving surface that receives thermoplastic material extruded from one or more nozzles in the extruder. The material receiving surface is either a support member that holds a three-dimensional printed object or a surface of the partially formed three-dimensional object during an additive manufacturing process. In the illustrative embodiments described herein, one or more actuators move the extruder about the support member, but alternative system embodiments move the support member to produce the relative motion in the process direction while the extruder remains stationary. Some systems use a combination of both systems for different axes of motion.

As used herein, the term "cross process direction" refers to an axis that is perpendicular to the process direction and parallel to the extruder faceplate and the material receiving surface. The process direction and cross-process direction refer to the relative path of movement of the extruder and the surface that receives the thermoplastic material. In some configurations, the extruder includes an array of nozzles that can extend in the process direction, the cross-process direction, or both. Adjacent nozzles within the extruder are separated by a predetermined distance in the cross-process direction. In some configurations, the system rotates the extruder to adjust the cross-process direction distance that separates different nozzles in the extruder to adjust the corresponding cross-process direction distance that separates the lines of thermoplastic material that are extruded from the nozzles in the extruder as the lines form a swath.

During operation of the additive manufacturing system, an extruder moves in the process direction along both straight and curved paths relative to a surface that receives thermoplastic material during the three-dimensional object printing process. Additionally, an actuator in the system optionally rotates the extruder about the Z axis to adjust the effective cross-process distance that separates nozzles in the extruder to enable the extruder to form two or more lines of thermoplastic material with predetermined distances between each line of the thermoplastic material. The extruder moves both along the outer perimeter to form outer walls of a two-dimensional region in a layer of the printed object and within the perimeter to fill all or a portion of the two-dimensional region with the thermoplastic material.

Figure 6:
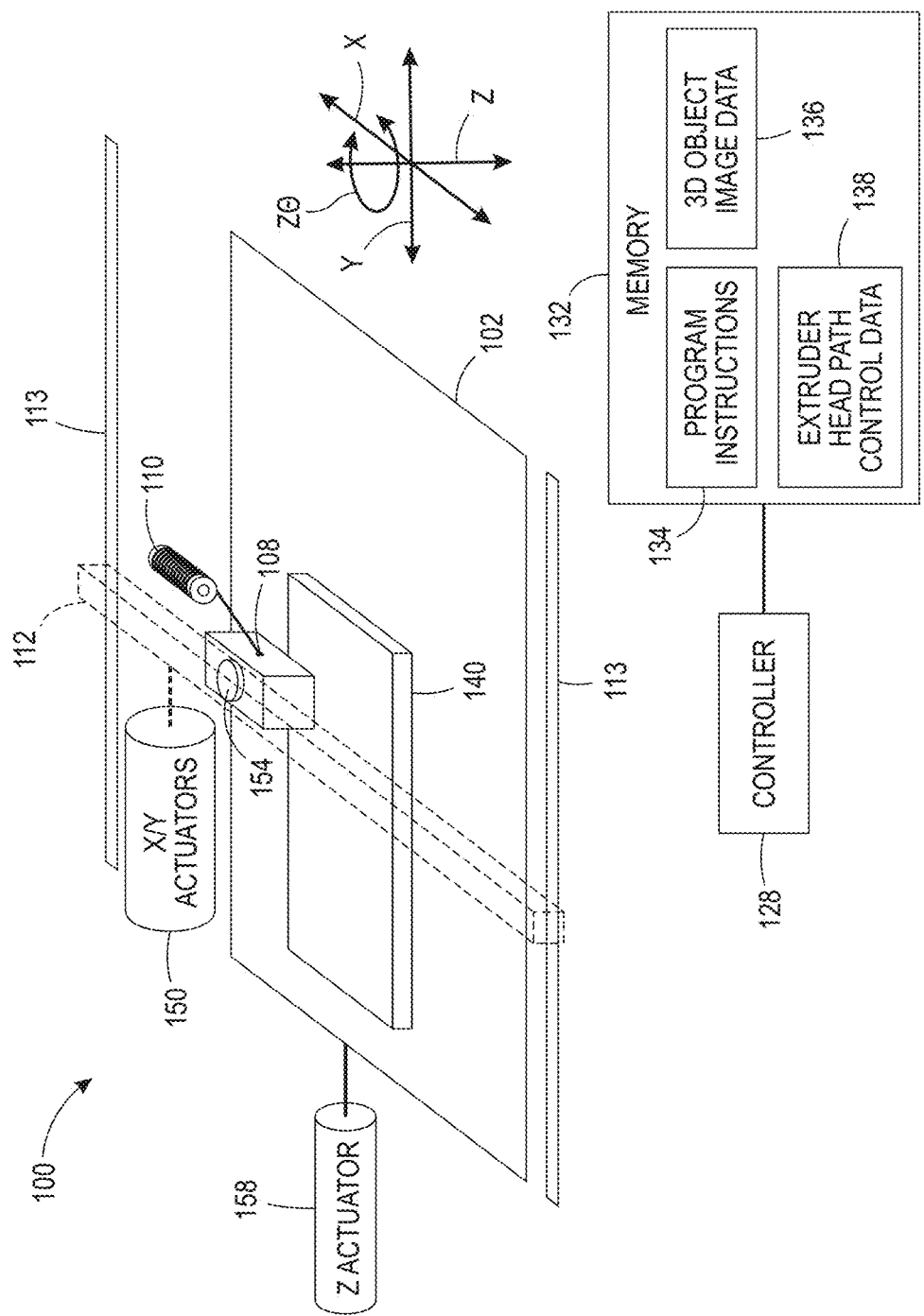
FIG. 6 is a diagram of a prior art three-dimensional object printer.

FIG. 6 depicts a prior art three-dimensional object additive manufacturing system or printer 100 that is configured to operate an extruder 108 to form a three-dimensional printed object 140. The printer 100 includes a support member 102, a multi-nozzle extruder 108, extruder support arm 112, controller 128, memory 132, X/Y actuators 150, an optional Zθ actuator 154, and a Z actuator 158. In the printer 100, the X/Y actuators 150 move the extruder 108 to different locations in a two-dimensional plane (the "X-Y plane") along the X and Y axes to extrude swaths of thermoplastic material that form one layer in a three-dimensional printed object, such as the object 140 that is depicted in FIG. 6. For example, in FIG. 6 the X/Y actuators 150 translate the support arm 112 and extruder 108 along guide rails 113 to move the arm and extruder along the Y axis while the X/Y actuators 150 translate the extruder 108 along the length of the support arm 112 to move the extruder along the X axis. The extruded patterns include both outlines of one or more regions in the layer and swaths of the thermoplastic material that fill the regions within the outline of thermoplastic material patterns. The Z actuator 158 controls the distance between the extruder 108 and the support member 102 along the Z axis to ensure that the nozzles in the extruder 108 remain at a suitable height to extrude thermoplastic material onto the object 140 as the object is formed during the printing process. The Zθ actuator 154 controls an angle of rotation of the extruder 108 about the Z axis for some embodiments of the extruder 108 that rotate about the Z axis. This movement controls the separation between nozzles in the extruder 108, although some extruders do not require rotation during the manufacturing process. In the system 100, the X/Y actuators 150, Zθ actuator 154, and the Z actuator 158 are embodied as electromechanical actuators, such as electric motors, stepper motors, or any other suitable electromechanical device. In the printer of FIG. 6, the three-dimensional object printer 100 is depicted during formation of a three-dimensional printed object 140 that is formed from a plurality of layers of thermoplastic material.

Figure 2:
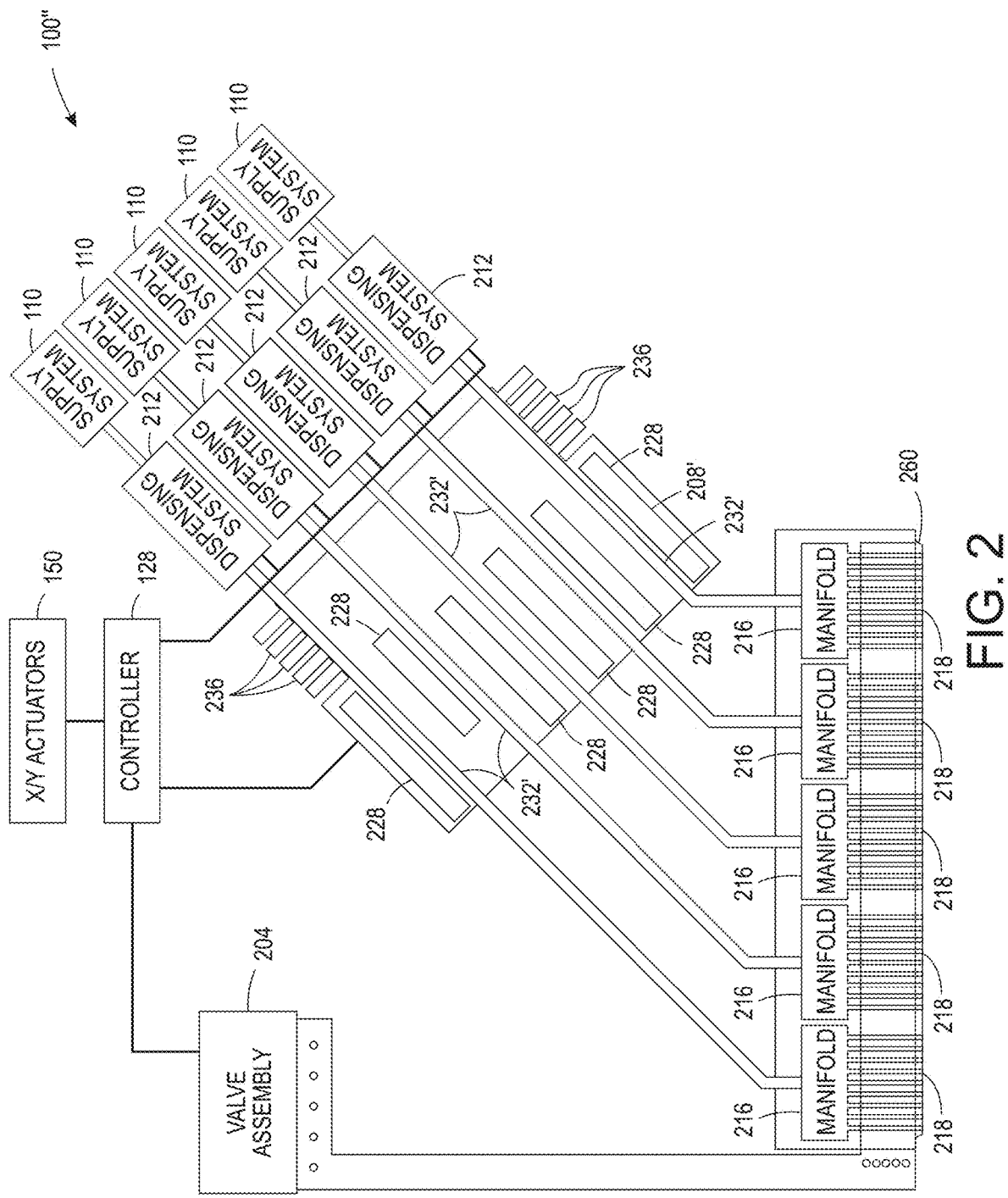
FIG. 2 is a block diagram of an alternative embodiment of the system shown in FIG. 1 that has only one heater with a plurality of channels.

The support member 102 is a planar member, such as a glass plate, polymer plate, or foam surface, which supports the three-dimensional printed object 140 during the manufacturing process. In the embodiment of FIG. 2, the Z actuator 158 also moves the support member 102 in the direction Z away from the extruder 108 after application of each layer of thermoplastic material to ensure that the extruder 108 maintains a predetermined distance from the upper surface of the object 140. The extruder 108 includes a plurality of nozzles and each nozzle extrudes thermoplastic material onto the surface of the support member 102 or a surface of a partially formed object, such the object 140. In the example of FIG. 6, extrusion material is provided as a filament from extrusion material supply 110, which is a spool of ABS plastic or another suitable extrusion material filament that unwinds from the spool to supply extrusion material to the extruder 108.

The support arm 112 includes a support member and one or more actuators that move the extruder 108 during printing operations. In the system 100, one or more actuators 150 move the support arm 112 and extruder 108 along the X and Y axes during the printing operation. For example, one of the actuators 150 moves the support arm 112 and the extruder 108 along the Y axis while another actuator moves the extruder 108 along the length of the support arm 112 to move along the X axis. In the system 100, the X/Y actuators 150 optionally move the extruder 108 along both the X and Y axes simultaneously along either straight or curved paths. The controller 128 controls the movements of the extruder 108 in both linear and curved paths that enable the nozzles in the extruder 108 to extrude thermoplastic material onto the support member 102 or onto previously formed layers of the object 140. The controller 128 optionally moves the extruder 108 in a rasterized motion along the X axis or Y axis, but the X/Y actuators 150 can also move the extruder 108 along arbitrary linear or curved paths in the X-Y plane.

The controller 128 is a digital logic device such as a microprocessor, microcontroller, field programmable gate array (FPGA), application specific integrated circuit (ASIC) or any other digital logic that is configured to operate the printer 100. In the printer 100, the controller 128 is operatively connected to one or more actuators that control the movement of the support member 102 and the support arm 112. The controller 128 is also operatively connected to a memory 132. In the embodiment of the printer 100, the memory 132 includes volatile data storage devices, such as random access memory (RAM) devices, and non-volatile data storage devices such as solid-state data storage devices, magnetic disks, optical disks, or any other suitable data storage devices. The memory 132 stores programmed instruction data 134 and three-dimensional (3D) object image data 136. The controller 128 executes the stored program instructions 134 to operate the components in the printer 100 to form the three-dimensional printed object 140 and print two-dimensional images on one or more surfaces of the object 140. The 3D object image data 136 includes, for example, a plurality of two-dimensional image data patterns that correspond to each layer of thermoplastic material that the printer 100 forms during the three-dimensional object printing process. The extruder path control data 138 include a set of geometric data or actuator control commands that the controller 128 processes to control the path of movement of the extruder 108 using the X/Y actuators 150 and to control the orientation of the extruder 108 using the Zθ actuator 154. The controller 128 operates the actuators to move the extruder 108 above the support member 102 as noted above while the extruder extrudes thermoplastic material to form an object.

Figure 3:
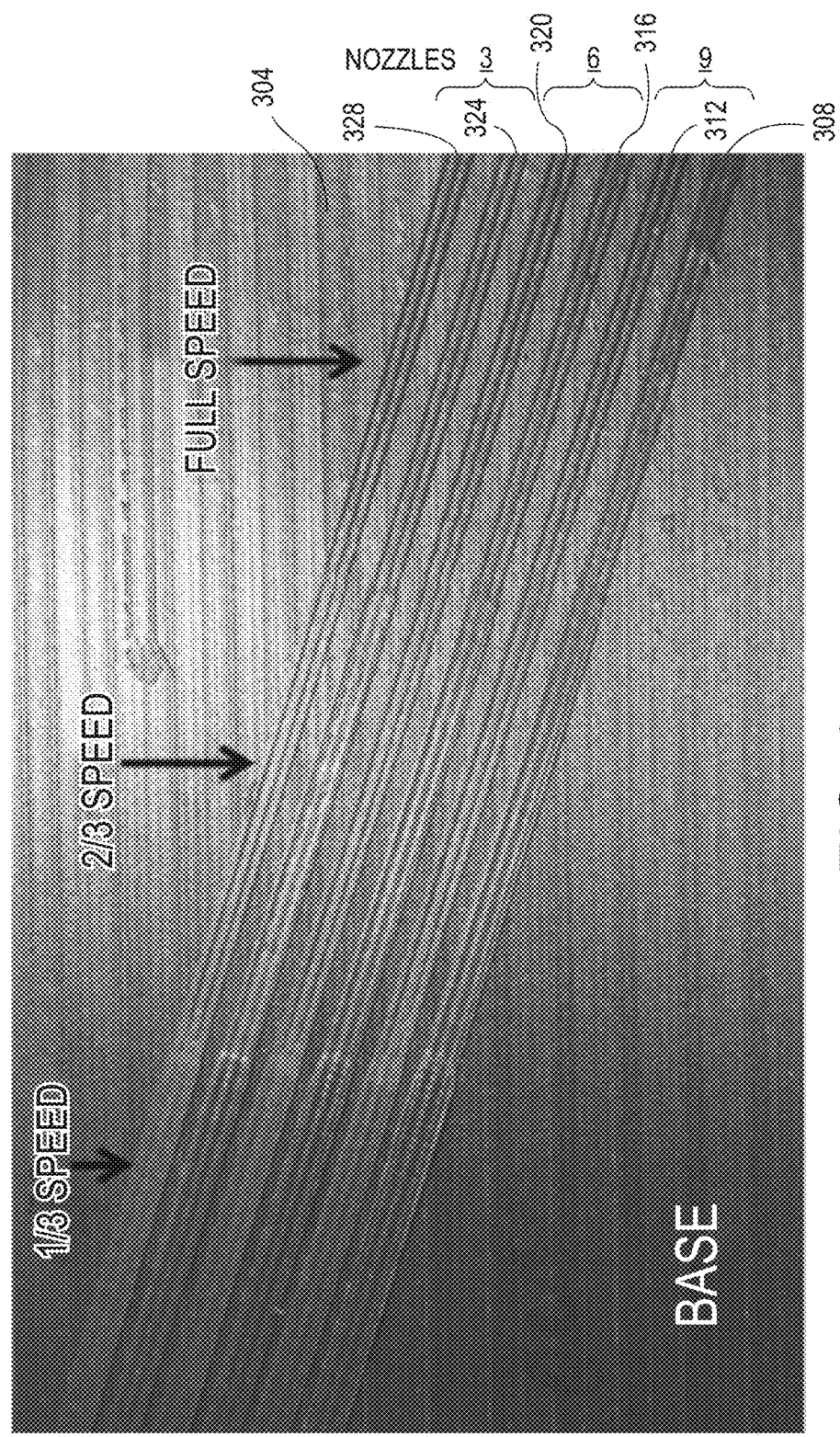
FIG. 3 illustrates an operation of the extruder shown in FIGS. 1 and 2 along a 342°-162° axis at different speeds to control the gaps between the swaths produced by the extruder.
Figure 4:
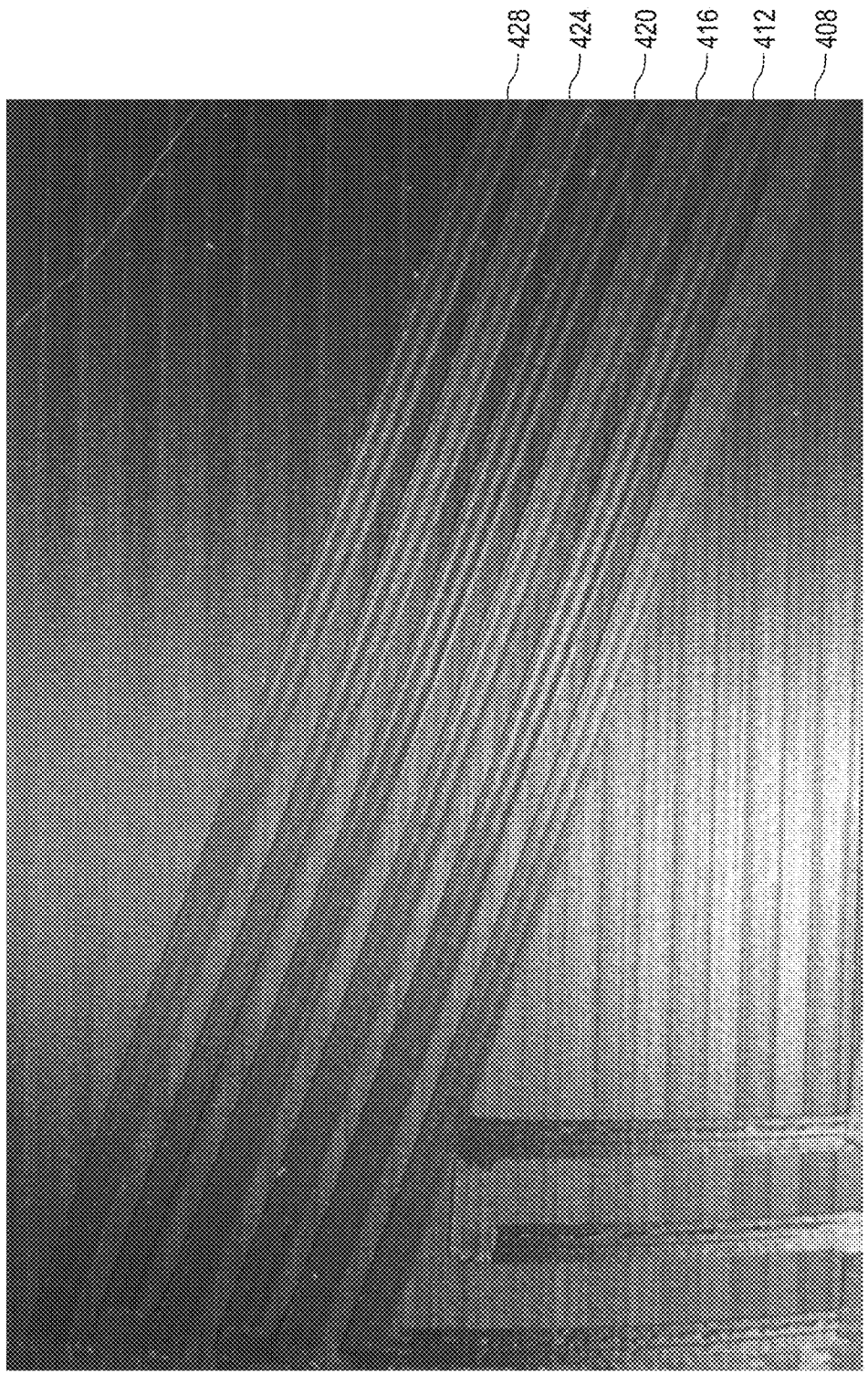
FIG. 4 illustrates an operation of the extruder shown in FIGS. 1 and 2 along a 342°-162° axis at ⅓ normal speed to remove the gaps between the swaths produced by the extruder.

FIG. 1 depicts an additive manufacturing system 100' having an extruder 108 that extrudes a plurality of thermoplastic materials through apertures in a faceplate as shown in FIG. 3 and FIG. 4, which is described in more detail below. Although the printer 100' is depicted as a printer that uses planar motion to form an object, other printer architectures can be used with the extruder and the controller configured to regulate speed of the extruder with reference to the angular orientation of the extruder as described in this document. These architectures include delta-bots, selective compliance assembly robot arms (SCARAs), multi-axis printers, non-Cartesian printers, and the like. The motions in these alternative embodiments still have process and cross-process directions as defined above and the nozzle spacing in the extruders of these embodiments still define the nozzle spacing with respect to the cross-process direction. Only one manifold 216 is shown in FIG. 1 to simplify the figure, but the extruder 108 can have a plurality of manifolds 216. In one embodiment, each manifold 216 in the extruder 108 is operatively connected to a different heater 208 that is fed by a different extrusion material supply 110 in a one-to-one correspondence. Alternatively, each manifold 216 can be coupled to a single heater 208' that houses a plurality of channels 232' that are fed by a plurality of extrusion material supplies 110 as shown in the embodiment 100" of FIG. 2. Each channel 232' in FIG. 2 supplies thermoplastic material to a manifold 216 in the extruder 108 to enable each manifold to receive a material that is different than a material that the other manifolds are receiving. In the extruder 108, each nozzle 218 is fluidly connected to only one of the manifolds within the extruder 108 so each nozzle can extrude a thermoplastic material that is different than the materials extruded from nozzles connected to other manifolds. Extrusion from each nozzle is selectively and independently activated and deactivated by controller 128 operating the valves in the valve assembly 204. Each nozzle 218 is also aligned with an aperture in a faceplate 260 to configure the nozzles for more flexible formation of swaths of the materials in an object.

In the embodiments of FIG. 1 and FIG. 2, a valve assembly 204 positions a valve between the manifolds in the extruder 108 and each of the nozzles connected to the manifolds in the extruder 108. The valve assembly 204 is operatively connected to the controller 128 so the controller can open and close the valves for extruding thermoplastic material from the plurality of nozzles in the extruder 108. Specifically, the controller 128 activates and deactivates different actuators in the assembly 204 connected to the valves in the extruder 108 to extrude thermoplastic material from the nozzles and form swaths of different thermoplastic materials in each layer of a three-dimensional printed object, such as object 140 in FIG. 6.

The system 100' of FIG. 1 also includes an extrusion material dispensing system 212 for each heater 208 that is connected to a manifold in the extruder 108. The extrusion material from each separate supply 110 is fed to the corresponding heater 208 at a rate that maintains the pressure of the thermoplastic material in the manifold connected to the heater within a predetermined range during operation of the system 100'. The dispensing system 212 is one embodiment that is suitable for regulating pressure of the thermoplastic material in each manifold of the extruder 108. In embodiment 100" of FIG. 2, a plurality of extrusion material dispensing systems 212 are operatively connected between a plurality of extrusion material supplies 110 and a channel 232' in the heater 208' in a one-to-one correspondence. Additionally, in both embodiments, the controller 128 is operatively connected to an actuator each dispensing system 212 to control the rate at which the dispensing system 212 delivers extrusion material from a supply 110 to the heater fed by the supply. The dispensing systems 212 of FIG. 2 can be configured as the dispensing system 212 of FIG. 1. The heaters 208 and 208' soften or melt the extrusion material 220 fed to the heater 208 via drive roller 224 (FIG. 1). Actuator 240 drives the roller 224 and is operatively connected to the controller 128 so the controller can regulate the speed at which the actuator drives the roller 224. Another roller opposite roller 224 is free-wheeling so it follows the rate of rotation at which roller 224 is driven. While FIG. 1 depicts a feed system that uses an electromechanical actuator and the driver roller 224 as a mechanical mover to move the filament 220 into the heater 208 or 208', alternative embodiments of the dispensing system 212 use one or more actuators to operate a mechanical mover in the form of a rotating auger or screw. The auger or screw moves solid phase extrusion material from a supply 110 in the form of extrusion material powder or pellets into a heater 208 or 208'.

In the embodiments of FIG. 1 and FIG. 2, each heater has a body formed from stainless steel that includes one or more heating elements 228, such as electrically resistive heating elements, which are operatively connected to the controller 128. Controller 128 is configured to connect the heating elements 228 to electrical current selectively to soften or melt the filament of extrusion material 220 in the channel or channels within the heater 208 or 208'. While FIG. 1 and FIG. 2 show heater 208 and heater 208' receiving extrusion material in a solid phase as solid filament 220, in alternative embodiments, the heaters receive the extrusion material in solid phase as powdered or pelletized extrusion material. Cooling fins 236 attenuate heat in the channels upstream from the heater. A portion of the extrusion material that remains solid in a channel at or near the cooling fins 236 forms a seal in the channel that prevents thermoplastic material from exiting the heater from any opening than the connection to the manifold 216, which maintains a temperature that keeps the extrusion material in a thermoplastic state as it enters the manifold. The extruder 108 can also include additional heating elements to maintain an elevated temperature for the thermoplastic material within each manifold within the extruder. In some embodiments, a thermal insulator covers portions of the exterior of the extruder 108 to maintain a temperature within the manifolds within the extruder. Again, the regions around the nozzles in FIG. 2 are maintained at a temperature that keeps the material in a thermoplastic state so it does not begin solidifying as it travels to the apertures in the faceplate.

To maintain a fluid pressure of the thermoplastic material within the manifolds 216 within a predetermined range, avoid damage to the extrusion material, and control the extrusion rate through the nozzles, a slip clutch 244 is operatively connected to the drive shaft of each actuator 240 that feeds filament from a supply 110 to a heater. As used in this document, the term "slip clutch" refers to a device applies frictional force to an object to move the object up to a predetermined set point. When the range about the predetermined set point for the frictional force is exceeded, the device slips so it no longer applies the frictional force to the object. The slip clutch enables the force exerted on the filament 220 by the roller 224 to remain within the constraints on the strength of the filament no matter how frequently, how fast, or how long the actuator 240 is driven. This constant force can be maintained by either driving the actuator 240 at a speed that is higher than the fastest expected rotational speed of the filament drive roller 224 or by putting an encoder wheel 248 on the roller 224 and sensing the rate of rotation with a sensor 252. The signal generated by the sensor 252 indicates the angular rotation of the roller 224 and the controller 128 receives this signal to identify the speed of the roller 224. The controller 128 is further configured to adjust the signal provided to the actuator 240 to control the speed of the actuator. When the controller is configured to control the speed of the actuator 240, the controller 128 operates the actuator 240 so its average speed is slightly faster than the rotation of the roller 224. This operation ensures that the torque on the drive roller 224 is always a function of the slip clutch torque.

The controller 128 has a set point stored in memory connected to the controller that identifies the slightly higher speed of the actuator output shaft over the rotational speed of the roller 224. As used in this document, the term "set point" means a parameter value that a controller uses to operate components to keep the parameter corresponding to the set point within a predetermined range about the set point. For example, the controller 128 changes a signal that operates the actuator 240 to rotate the output shaft at a speed identified by the output signal in a predetermined range about the set point. In addition to the commanded speed for the actuator, the number of valves opened or closed in the valve assembly 204 and the torque set point for the clutch also affect the filament drive system 212 operation. The resulting rotational speed of the roller 224 is identified by the signal generated by the sensor 252. A proportional-integral-derivative (PID) controller within controller 128 identifies an error from this signal with reference to the differential set point stored in memory and adjusts the signal output by the controller to operate the actuator 240. Alternatively, the controller 128 can alter the torque level for the slip clutch or the controller 128 can both alter the torque level and adjust the signal with which the controller operates the actuator.

The slip clutch 244 can be a fixed or adjustable torque friction disc clutch, a magnetic particle clutch, a magnetic hysteresis clutch, a ferro-fluid clutch, an air pressure clutch, or permanent magnetic clutch. The clutch types that operate magnetically can have their torque set points adjusted by applying a voltage to the clutches. This feature enables the torque set point on the clutch to be changed with reference to print conditions. The term "print conditions" refers to parameters of the currently ongoing manufacturing operation that affect the amount of thermoplastic material required in the manifold for adequate formation of the object. These print conditions include the type of extrusion material being fed to the extruder, the temperature of the thermoplastic material being emitted from the extruder, the speed at which the extruder is being moved in the X-Y plane, the position of the feature being formed on the object, the angle at which the extruder is being moved relative to the platform, and the like.

Figure 7:
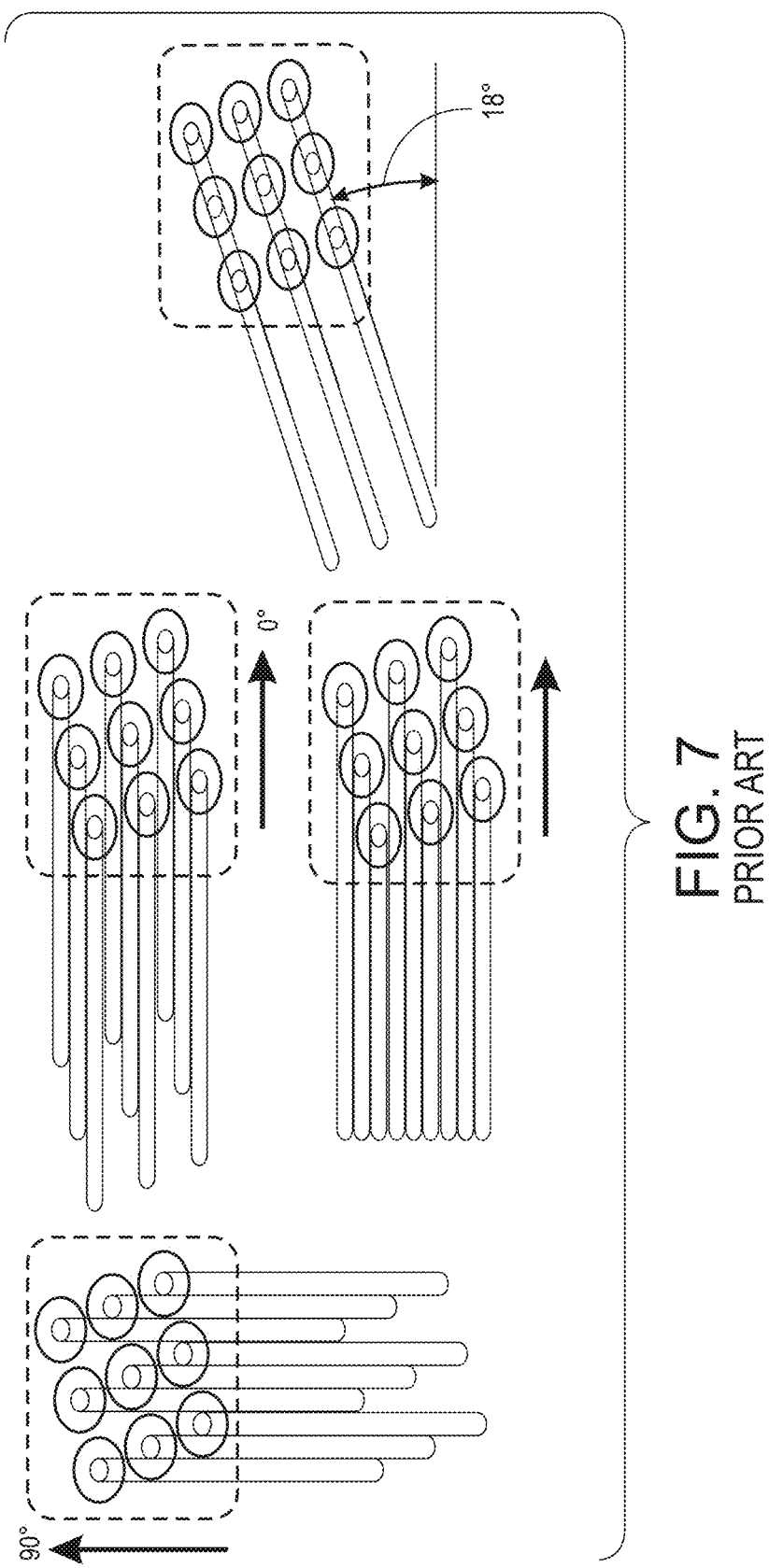
FIG. 7 depicts swaths that can be formed by a nine nozzle faceplate when oriented at 0°, 90°, and 18°.

In the embodiments shown in FIG. 1 and FIG. 2, the controller 128 is configured to transmit one or more signals to the X/Y actuators 150 to regulate the speed at which the extruder 108 is moved above platform 102. The controller 128 is configured to regulate the speed of the extruder 108 with reference to the angle of the path at which the extruder 108 is to be moved and the orientation of the extruder faceplate as it moves along that path. When the extruder 108 is moved during extrusion in either direction along the 0°-180° axis or the 90°-270° axis and the extruder faceplate is oriented as shown in FIG. 7, the controller 128 moves the extruder at a nominal speed with reference to the number of nozzles opened for the extrusion of thermoplastic material. Although an extruder face can theoretically be oriented so all of the opened nozzles contribute to a contiguous swath along any motion path, practical considerations can prevent such orientations. When object image data and extruder path data require an orientation for the extruder faceplate and its motion path relative to the platform that interferes with the ability of the extruder to form a contiguous swath, the controller can reduce the speed at which the extruder is moved along that motion path relative to the platform to address this interference.

As noted above, the gaps produced between the lines forming a swath generated by the nozzles in the faceplate depicted in FIG. 7 are greatest when the extruder faceplate is oriented as shown and the angle of extruder motion is along one of the 18°, 108°, 198°, and 288° paths. FIG. 3 depicts the operation of an extruder head in which the nozzles in the faceplate are the mirror image of the nozzle arrangement in FIG. 7. When this type of extruder head is moved along one of the 72°, 162°, 252°, and 342° paths, the rows and columns of the nozzle array are orthogonal to one another and the nozzles produce a swath having three separate lines when all nine nozzles are opened. FIG. 3 illustrates the effect of speed regulation in either direction along the 162°-342° path for such an extruder. The base 304 has been printed at 0°-180° using an extruder having a nine-nozzle faceplate that is oriented and moved as depicted in FIG. 7. The diagonal swaths are printed on the base 304 along the 162°-342° path at which groups of three nozzles align coincidentally. The diagonal swaths are printed in the order 308, 312, 316, 320, 324, and 328 with swaths 308, 316, and 324 being printed as the extruder moves along the 162° path and with swaths 312, 320, and 328 being printed as the extruder moves along the 342° path. That is, the extruder 108 is oriented as shown by the two middle faceplates in FIG. 7 and is moved along the 162° path until it reaches a stop position where it is translated at 90° without extruding any material and then is returned along the 342° path until it reaches another stop position where it is translated at 90° without extruding any material to reach a position for forming the next pair of swaths. Swaths 308 and 312 were formed with nine open nozzles, swaths 316 and 320 were formed with six open nozzles, and swaths 324 and 328 were formed with three open nozzles. Each diagonal swath is printed so the extruder is moving at ⅓ of the nominal speed at the left portion of the swarth, at ⅔ of the nominal speed at the center portion of the swath, and at the nominal speed at the right portion of the swath. The nominal speed in this example is 4000 mm/min.

As shown in FIG. 3, moving the extruder oriented as described above along the 162°-342° path at the nominal speed does not enable the lines of the extruded thermoplastic material emitted from the open nozzles to spread enough to fill the gaps and make a contiguous swath in the cross-process direction. The size of the gap depends on the number of open nozzles and the speed of the extruder. As the speed is reduced in each swath, the amount of material extruded and the extent of thermoplastic material spread increases as can be seen in the center and left portions of the swaths. As shown in the figure, the swaths formed by moving the extruder along the 162° path differ in the amount of material spread than those formed by moving the extruder along the 342° path. This difference may be due in part to the order of printing and in part to a misalignment of the extruder. This effect indicates that some amount of extruder misalignment can be compensated by changing the speed of the extruder as it moves. To compensate for misalignment, a misalignment parameter is determined during a printer calibration and that parameter is stored in the memory operatively connected to the controller 128. During object printing, the controller 128 adjusts the speed for the extruder with reference to the misalignment parameter. FIG. 3 also reveals that the width of a swath is not necessarily independent of angle of extruder movement. For the angle shown in the figure, the width of the swath is ideally three times the spacing between the column of nozzles at the angle of rotation plus three times the width of a single nozzle. The spacing width at the angle of rotation is 0.865 mm. Thus, for the nine-nozzle configuration at the rotated angle used to form the swaths in FIG. 3, the width of a swath is: 1.265×3, which is approximately 3.8 mm.

In FIG. 4, another set of swaths 408, 412, 416, 420, 424, and 428 have been printed along the 162-342° path with the same number of nozzles with an extruder having a nozzle array arranged as explained above with regard to FIG. 3. Swaths 408 and 412 are printed at ⅔ of the nominal speed, swaths 416 and 420 are printed at ½ nominal speed, and swaths 424 and 428 are printed at ⅓ nominal speed. The number of opened nozzles on the various paths remains as described above with regard to FIG. 3. Thus, all portions of each swath have been formed at some speed that is less than the nominal speed. The resulting spreads, which are greater than those produced at the nominal speed in FIG. 3, indicate that even at the angles that produce the greatest gaps between lines within a swath, the regulation of extruder speed can compensate for the non-optimal layout of the nozzles and that regardless of the gap width, the extruder speed can be reduced to a level that maintains contiguous swaths in the cross-process direction without having to print the region with multiple passes. FIG. 4 also shows that the gaps between lines can be reduced by increasing the number of open nozzles aligned with the printing direction. Empirical experimentation is used to establish the optimal speeds for all of the extruder motion angles that align nozzles for a particular faceplate configuration. Other extruder motion angles require less reduction in speed than these angles that depend on the projection of the spacing between nozzles as the extruder moves in the process direction.

The results depicted in FIG. 3 and FIG. 4 show that, regardless of the nominal extruder movement speed, slower movement speed enables greater flow through the nozzles of a faceplate. The flow through the nozzles at the nominal extruder speed is enabled by maintaining the pressure in the nozzles established for the preferred extruder faceplate orientation and movement angles of 0°, 90°, 180°, and 270°. This pressure needs to be higher for faster extruder movement speeds at these angles for movement and lower for slower extruder movement speeds at these angles for movement to get the same contiguous swath width in the cross-process direction. To achieve this effect, enough filament is fed into the heater to maintain the appropriate predetermined pressure at these angles. When the extruder is oriented and moved along paths at angles where multiple nozzles are aligned, such as 72° for the extruder used to form the swaths in FIG. 3 and FIG. 4, the requisite higher pressure is maintained by feeding the required amount of filament and moving at the empirically determined speed for extruding that amount of filament. Thus, a balance is maintained between thermoplastic material pressure in the extruder and the amount of thermoplastic material extruded from the extruder. If speed of the extruder is adjusted to match the amount of filament fed to the heater of the extruder, then the amount of material extruded is also adjusted to preserve the pressure/extruded amount equilibrium.

Figure 5:
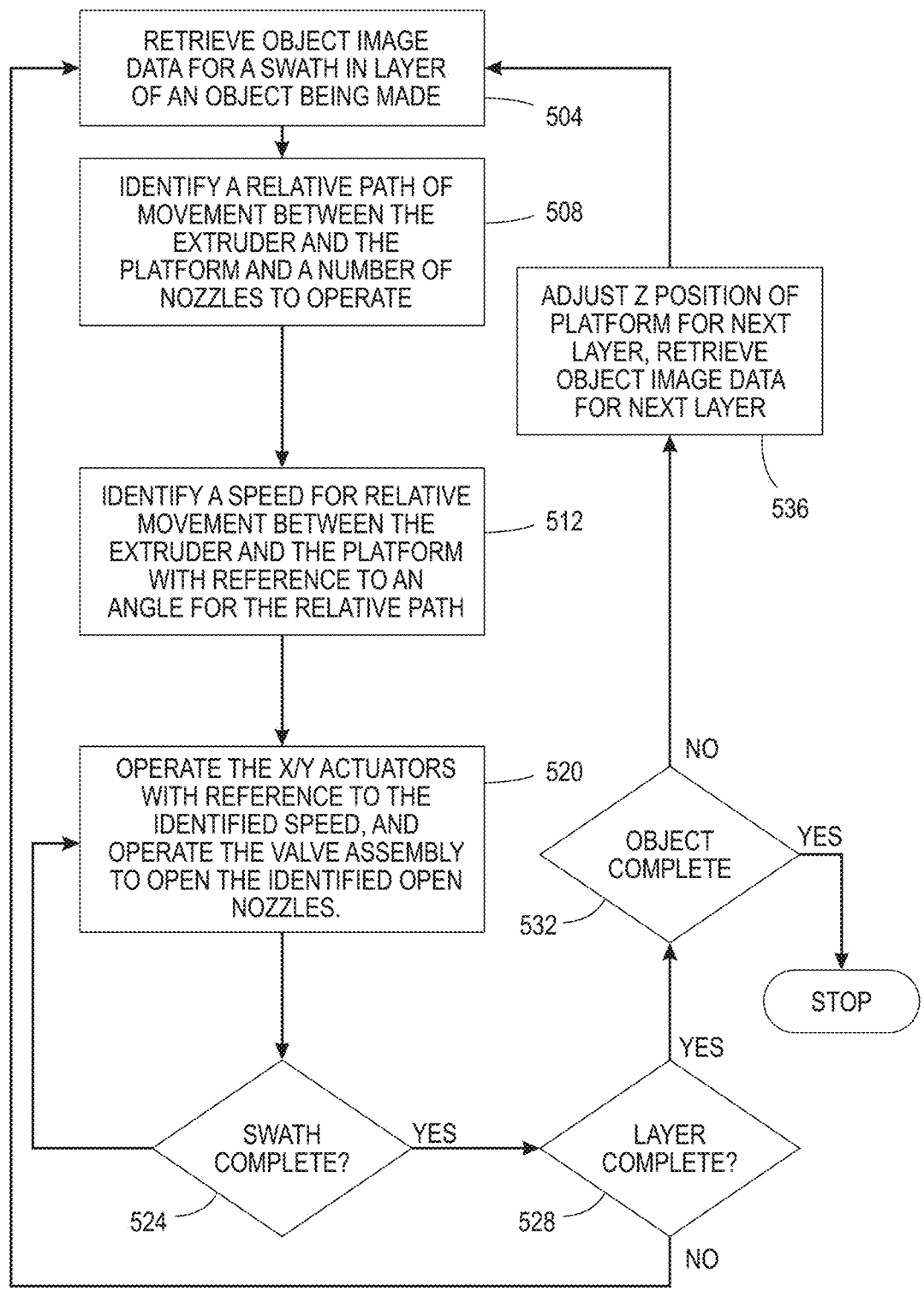
FIG. 5 is a flow diagram of a process for operating a printer that adjusts the speed of extruder movement with reference to an angle of extruder movement

FIG. 5 depicts a block diagram of a process 500 for operation of a printer that adjusts the speed of extruder movement with reference to an angle of extruder movement. In the discussion below, a reference to the process 500 performing a function or action refers to the operation of a controller, such as controller 128, to execute stored program instructions to perform the function or action in association with other components in the printer. The process 500 is described in conjunction with the printer 100' of FIG. 1 and printer 100" of FIG. 2 for illustrative purposes.

The process 500 begins with the controller retrieving object image data for a swath in a layer of an object being made (block 504). The controller identifies a relative path of movement between the extruder and the platform as well as the number of nozzles that are to be open during the movement of the extruder (block 508). The identified relative path of movement includes identifying the orientation of the extruder faceplate as it moves along the path. The process then identifies a speed for the relative movement between the extruder and the platform with reference to an angle for the relative path (block 512). The controller then operates the filament movers for the extrusion material filament supplies that supply filament to the heater channels connected to the manifolds for the open nozzles, operates the X/Y actuators to move the extruder along the relative path for the extruder with reference to the identified speed, and operates the valve assembly to open the identified nozzles (block 520). While the swath is being formed (block 524), the controller continues to operate these components accordingly (block 520). When the swath is complete (block 524), the process determines whether the layer is complete (block 528), and if it is not complete, it retrieves the object image data for the next swath in the layer (block 504). Otherwise, the process determines if the last layer of the object has been formed (block 532), and if it has been formed, the process stops. Otherwise, the process adjusts the position of the extruder relative to the platform along the Z axis and retrieves the object image data for the next layer (block 536) so the printing of the next layer can occur (blocks 504 to 528).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. An apparatus comprising:
   a platform configured to support an object during manufacturing;
   an extruder having a plurality of nozzles;
   at least one actuator operatively connected to at least one of the extruder and the platform, the at least one actuator being configured to move the at least one of the extruder and the platform relative to the other of the extruder and the platform; and
   a controller operatively connected to the extruder and the at least one actuator, the controller being configured to:
      operate the extruder using object image data and extruder path data to extrude thermoplastic material through at least two of the nozzles of the extruder to form a swath of thermoplastic material along a path of relative movement between the extruder and the platform;
      operate the at least one actuator to move the at least one of the extruder and the platform along the path of relative movement at a predetermined speed;
      select an angle for the path of relative movement between the extruder and the platform to be a first angle when the swath of thermoplastic material is placed within an interior portion of the object and to select the angle of the path of relative movement to be a second angle when the swath of thermoplastic material is placed on the exterior of the object, the first angle being different than the second angle;
      select the predetermined speed for the path of relative movement between the extruder and the platform to be less than a nominal speed of the extruder using an orientation of a faceplate of the extruder and the selected angle for the path of relative movement between the extruder and the platform to make the swath of the thermoplastic material contiguous in a cross-process direction when movement of the extruder with the orientation of the faceplate of the extruder along the selected angle of the path of relative movement at the nominal speed produces gaps between the thermoplastic material extruded from the at least two different nozzles;
      select a number of nozzles in the extruder for extrusion of the thermoplastic material, the selected number of nozzles being at least two nozzles and up to all of the nozzles in the plurality of nozzles; and
      adjust the selected predetermined speed using the selected number of nozzles.

2. The apparatus of claim 1 wherein the predetermined speed is one-half of the nominal speed of the extruder when the orientation of the extruder faceplate and the path of relative movement is at an angle that arranges the plurality of nozzles in the faceplate into an array having orthogonal columns and rows.

3. The apparatus of claim 1, the controller being further configured to:
   adjust the predetermined speed for movement of the extruder along the path of relative movement using a misalignment parameter for the extruder.

4. The apparatus of claim 1, the controller being further configured to:
   select the first angle to be a 0°-180° axis or a 90°-270° axis for the path of relative movement between the extruder and the platform.

5. The apparatus of claim 1 further comprising:
a plurality of extrusion material supplies;
a heater having a plurality of channels, each channel of the heater being operatively connected to only one extrusion material supply in the plurality of extrusion material supplies in a one-to-one correspondence between the plurality of channels and the plurality of extrusion material supplies and each channel in the heater being operatively connected to only one manifold in the extruder in a one-to-one correspondence between the plurality of channels and a plurality of manifolds in the extruder so thermoplastic material produced by each channel enters the manifold to which the channel is operatively connected;
a plurality of mechanical movers, each mechanical mover being configured to move extrusion material from one of the extrusion material supplies to the corresponding one of the channels in the heater, each mechanical mover also being configured for independent control of a rate at which the extrusion material is supplied to the corresponding one channel in the heater; and
the controller being further configured to:
operate each mechanical mover corresponding to one of the selected nozzles to move extrusion material into the corresponding channel in the heater at a predetermined rate that maintains a predetermined pressure in the corresponding manifold while the extruder is moved at the selected predetermined speed.

6. The apparatus of claim 5, the controller being further configured to:
select the predetermined speed to be greater than the nominal speed; and
increase the predetermined rate when the selected predetermined speed is greater than the nominal speed.

* * * * *